(12) United States Patent
Chetuparambil et al.

(10) Patent No.: US 8,032,587 B2
(45) Date of Patent: Oct. 4, 2011

(54) METHOD AND APPARATUS FOR CLIENT-SIDE AGGREGATION OF ASYNCHRONOUS FRAGMENTED REQUESTS

(75) Inventors: Madhu K. Chetuparambil, Raleigh, NC (US); Curtiss J. Howard, Raleigh, NC (US); Todd E. Kaplinger, Raleigh, NC (US); Erinn E. Koonce, Durham, NC (US); Maxim A. Moldenhauer, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 11/846,423

(22) Filed: Aug. 28, 2007

(65) Prior Publication Data

US 2009/0063618 A1    Mar. 5, 2009

(51) Int. Cl.
*G06F 15/16* (2006.01)
*G06F 9/44* (2006.01)
*G06F 9/45* (2006.01)

(52) U.S. Cl. ........ 709/203; 717/128; 717/130; 717/131; 717/136

(58) Field of Classification Search .................. 709/203; 717/128, 130, 131, 136
See application file for complete search history.

(56) References Cited

U.S. PATENT DOCUMENTS

| | | | |
|---|---|---|---|
| 5,548,723 A | 8/1996 | Pettus | |
| 5,617,570 A | 4/1997 | Russell et al. | |
| 5,832,219 A | 11/1998 | Pettus | |
| 5,944,779 A | 8/1999 | Blum | |
| 6,112,243 A | 8/2000 | Downs et al. | |
| 6,223,217 B1 | 4/2001 | Pettus | |
| 6,430,607 B1 | 8/2002 | Kavner | |
| 6,505,257 B2 | 1/2003 | Murata et al. | |
| 6,643,708 B1 | 11/2003 | Francis et al. | |
| 6,651,143 B2 | 11/2003 | Mounes-Toussi | |
| 6,665,704 B1 | 12/2003 | Singh | |
| 6,961,776 B1 | 11/2005 | Buckingham et al. | |
| 6,963,917 B1 | 11/2005 | Callis et al. | |
| 6,985,939 B2 | 1/2006 | Fletcher et al. | |
| 7,003,570 B2 | 2/2006 | Messinger et al. | |
| 7,028,306 B2 | 4/2006 | Boloker et al. | |
| 7,127,713 B2 | 10/2006 | Davis et al. | |
| 7,130,885 B2 | 10/2006 | Chandra et al. | |
| 7,209,915 B1 | 4/2007 | Taboada et al. | |
| 7,240,280 B2 | 7/2007 | Jolley et al. | |
| 7,398,301 B2 | 7/2008 | Hennessey et al. | |

(Continued)

OTHER PUBLICATIONS

Valeria Cardellini, et al., "The State of the Art in Locally Distributed Web-Server Systems", ACM Computing Surveys, vol. 34, No. 2, Jun. 2002, pp. 263-311.

(Continued)

*Primary Examiner* — Phuoc Nguyen
*Assistant Examiner* — Mark Fearer
(74) *Attorney, Agent, or Firm* — Steven M. Greenberg, Esq.; Carey, Rodriguez, Greenberg & Paul

(57) ABSTRACT

The Asynchronous Aggregator shifts the burden of retrieving and aggregating asynchronous responses by replacing asynchronous requests in an original request thread with placcholders with a unique identifier, creating new threads for each asynchronous request, writing a script to request the asynchronous request output, and returning the original request and the script to the client. Each of the new threads run independently and when completed, place the output in the server store. The script then requests each output from the server store as the output becomes available to fill the placeholders.

9 Claims, 5 Drawing Sheets

U.S. PATENT DOCUMENTS

| | | |
|---|---|---|
| 7,447,731 B2 | 11/2008 | Calo et al. |
| 7,502,760 B1 | 3/2009 | Gupta |
| 7,502,833 B2 | 3/2009 | Schaeck |
| 7,536,472 B2 | 5/2009 | O'Neal et al. |
| 7,590,752 B2 | 9/2009 | Van Oldenborgh et al. |
| 2002/0111814 A1 | 8/2002 | Barnett et al. |
| 2002/0184145 A1 | 12/2002 | Sijacic et al. |
| 2003/0055878 A1 | 3/2003 | Fletcher et al. |
| 2003/0063122 A1 | 4/2003 | Cichowlas et al. |
| 2003/0070006 A1 | 4/2003 | Nadler et al. |
| 2003/0084094 A1 | 5/2003 | Shim et al. |
| 2003/0084097 A1* | 5/2003 | Messinger et al. ............ 709/203 |
| 2003/0145048 A1 | 7/2003 | Susarla et al. |
| 2003/0154239 A1 | 8/2003 | Davis et al. |
| 2003/0226107 A1 | 12/2003 | Pelegri-Llopart et al. |
| 2004/0015578 A1 | 1/2004 | Karakashian et al. |
| 2004/0030795 A1 | 2/2004 | Hesmer et al. |
| 2004/0057749 A1 | 3/2004 | Saito et al. |
| 2004/0103413 A1 | 5/2004 | Mandava et al. |
| 2004/0205108 A1 | 10/2004 | Tanaka |
| 2004/0205613 A1 | 10/2004 | Li et al. |
| 2004/0243577 A1 | 12/2004 | Choudhary et al. |
| 2004/0243928 A1 | 12/2004 | Hesmer et al. |
| 2004/0264385 A1 | 12/2004 | Hennessey et al. |
| 2005/0028095 A1 | 2/2005 | Kondo et al. |
| 2005/0038808 A1 | 2/2005 | Kutch |
| 2005/0044233 A1 | 2/2005 | Cai et al. |
| 2005/0125508 A1 | 6/2005 | Smith et al. |
| 2005/0155027 A1 | 7/2005 | Wei |
| 2005/0198118 A1 | 9/2005 | Viger et al. |
| 2006/0041637 A1 | 2/2006 | Jerrard-Dunne |
| 2006/0168139 A1* | 7/2006 | Messinger et al. ............ 709/219 |
| 2006/0230062 A1 | 10/2006 | Roy-Chowdhury et al. |
| 2007/0112913 A1* | 5/2007 | Bales ............................ 709/204 |
| 2007/0143460 A1 | 6/2007 | Ben-David et al. |
| 2007/0226342 A1 | 9/2007 | Apelbaum |
| 2008/0016151 A1 | 1/2008 | Howard et al. |
| 2008/0071922 A1 | 3/2008 | Chetuparambil et al. |
| 2008/0127234 A1 | 5/2008 | Hesmer et al. |
| 2009/0055469 A1 | 2/2009 | Burckart et al. |
| 2009/0063618 A1 | 3/2009 | Chetuparambil et al. |

OTHER PUBLICATIONS

Vijay K. Naik, et al., "Adaptive Resource Sharing in a Web Services Environment", H.A. Jacobsen (Ed.): Middleware 2004, LNCS 3231, 2004, pp. 311-330.

John Reumann, et al., "Stateful Distributed Interposition", ACM Transactions on Computer Systems, vol. 22, No. 1, Feb. 2004, pp. 1-48.

Reiner Kraft, "Designing a Distributed Access Control Processor for Network Services on the Web", ACM Workshop on XML Security, Nov. 22, 2002, Fairfax VA, ACM 1-58113-632-3/02/0011, pp. 36-52.

Erich Liebmann, et al., "Adaptive Data Dissemination and Caching for Edge Service Architectures built with the J2EE", SAC'04, Mar. 14-17, 2004, Nicosia, Cyprus, ACM 1-58113-812-1/03/04, pp. 1717-1724.

* cited by examiner

METHOD AND APPARATUS FOR CLIENT-SIDE AGGREGATION OF ASYNCHRONOUS FRAGMENTED REQUESTS

FIELD OF THE INVENTION

The invention relates generally to computer data processing, and particularly to asynchronous execution of requests on a distributed computer system.

BACKGROUND OF THE INVENTION

Clients use distributed computer environments to perform a variety of tasks across multiple applications. For a typical task, a client sends a request to a distributed computer environment, which returns a response to the client. While this seems simple enough, there are actually several intermediate steps involved in executing such a request. First, a user or an application initiates the client request by sending the request to an application server. The application server is a computer acting as an intermediary between the client and other resources making up the distributed computer environment. The application server may perform such tasks as verifying the client's security credentials and determining which resource on the distributed computer environment is appropriate for executing the client's request. Second, the application server forwards the request to the appropriate resource on the client's behalf. Third, after the request executes on the appropriate resource, the application server sends the response to the client.

Certain fragment markup and assembly technologies, such as EDGE SIDE INCLUDE (ESI), DELTA ENCODING, and other fragment markup and assembly engines allow for the fragmentation of requests under certain circumstances at the application server. Often, requests can be split into multiple smaller tasks, or "fetches" and distributed across multiple resources. After all the fetches are executed, the fragmented responses are reassembled and returned to the client. Fragmentation allows for more efficient use of resources and for lower cycle-times on a distributed computer environment. Once all the fragments are executed, the responses are aggregated and returned to the client.

When fragments execute in sequence, there can be a long delay from the time the request is made until the fragmented responses are aggregated and returned to the client. To shorten the overall time needed to execute a set of fragments, methods have been developed to allow request fragments to execute asynchronously. With asynchronous execution, fragments can be executed simultaneously, or in any order, reducing the overall time needed to execute a fragmented request.

One example of dispatching asynchronous threads is disclosed in U.S. Pat. No. 7,003,570 owned by BEA Systems, Inc. The '570 patent discloses a system that operates on an application server that provides for asynchronous processing of request fragments. After all the request fragments are executed and responses returned to the application server, the responses are aggregated and returned to the client from the application server. But aggregation takes place at the application server, and application server system resources are tied up.

In addition to tying up application server system resources, current asynchronous fragment execution systems require that the client wait until all the fragments are executed and aggregated before receiving a response. Depending on the complexity of the original request, the client may have a long wait before receiving a response. Meanwhile, the application server is tied up with the execution thread until the entire request is executed. The delay is particularly acute when executing multiple fragments and aggregating the fragmented responses before returning a response to the client. Therefore, a need exists for a way to free up the execution thread and shift the burden of retrieving and aggregating the response to the client, freeing up application server resources while preserving in a fragment any context included in the original request.

SUMMARY OF THE INVENTION

The Asynchronous Aggregator frees up an original execution thread and shifts the burden of retrieving and aggregating asynchronous responses from the server to the client. This is achieved by creating new threads for the execution of each asyncnhronous request, registering the asynchronous include for each asynchronous request with a server store, replacing asynchronous request content in the response with placeholders that contain a unique identifier, writing javascript in place of each asynchronous include to enable the client to request the asynchronous include content, the returning the modified response output containing the javascript to the client. Each of the new threads run independently and, when completed, place the output in the server store. The javascript then requests each output from the server store to fill the placeholders.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Asynchronous Aggregator."

Figure 1:
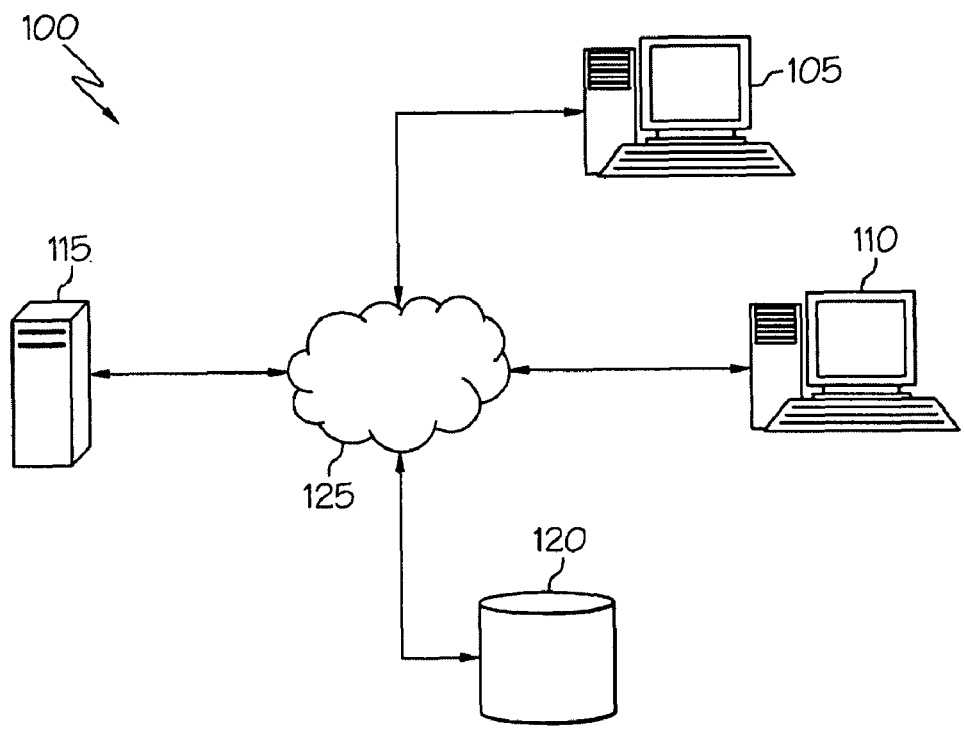
FIG. 1 depicts an exemplary computer network.

Additionally, the Asynchronous Aggregator is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
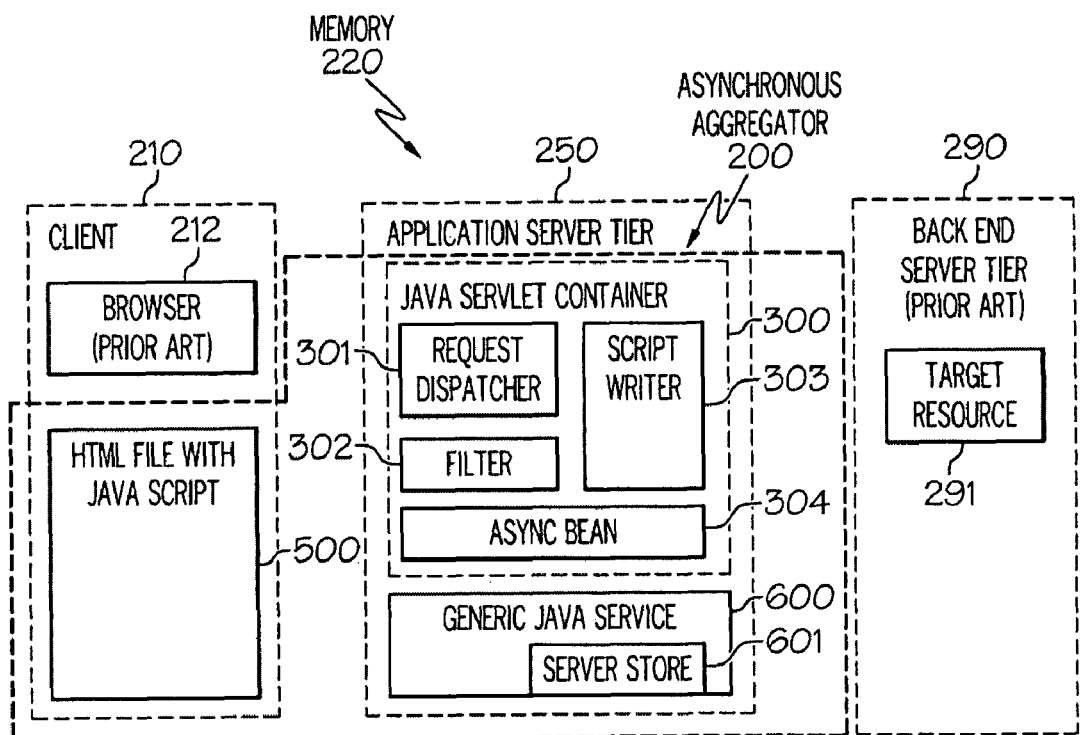
FIG. 2 depicts an exemplary memory on a distributed computer system containing the Asynchronous Aggregator.

Asynchronous Aggregator 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. As shown in FIG. 2, memory 220 is distributed across a plurality of media, namely, client 210, application server tier 250, and backend server tier 290. Thus, FIG. 2 is included merely as a descriptive expedient and does not necessarily reflect any particular physical embodiment of memory 220. As depicted in FIG. 2, though, memory 220 may include additional data and programs. Of particular import to Asynchronous Aggregator 200, memory 220 may include browser 212 on client 210 and target resource 291 on backend server tier 290. Asynchronous Aggregator 200 has three components: Java Servlet Container 300 and generic Java Service 600 located on application server tier 250, and JavaScript 500 on client 210. Java Servlet 300 has four sub-components: request dispatcher 301, filter 302, script writer 303, and Async Bean 304. Generic Java Service 600 has an allocation of memory for storage, server store 601.

Figure 3:
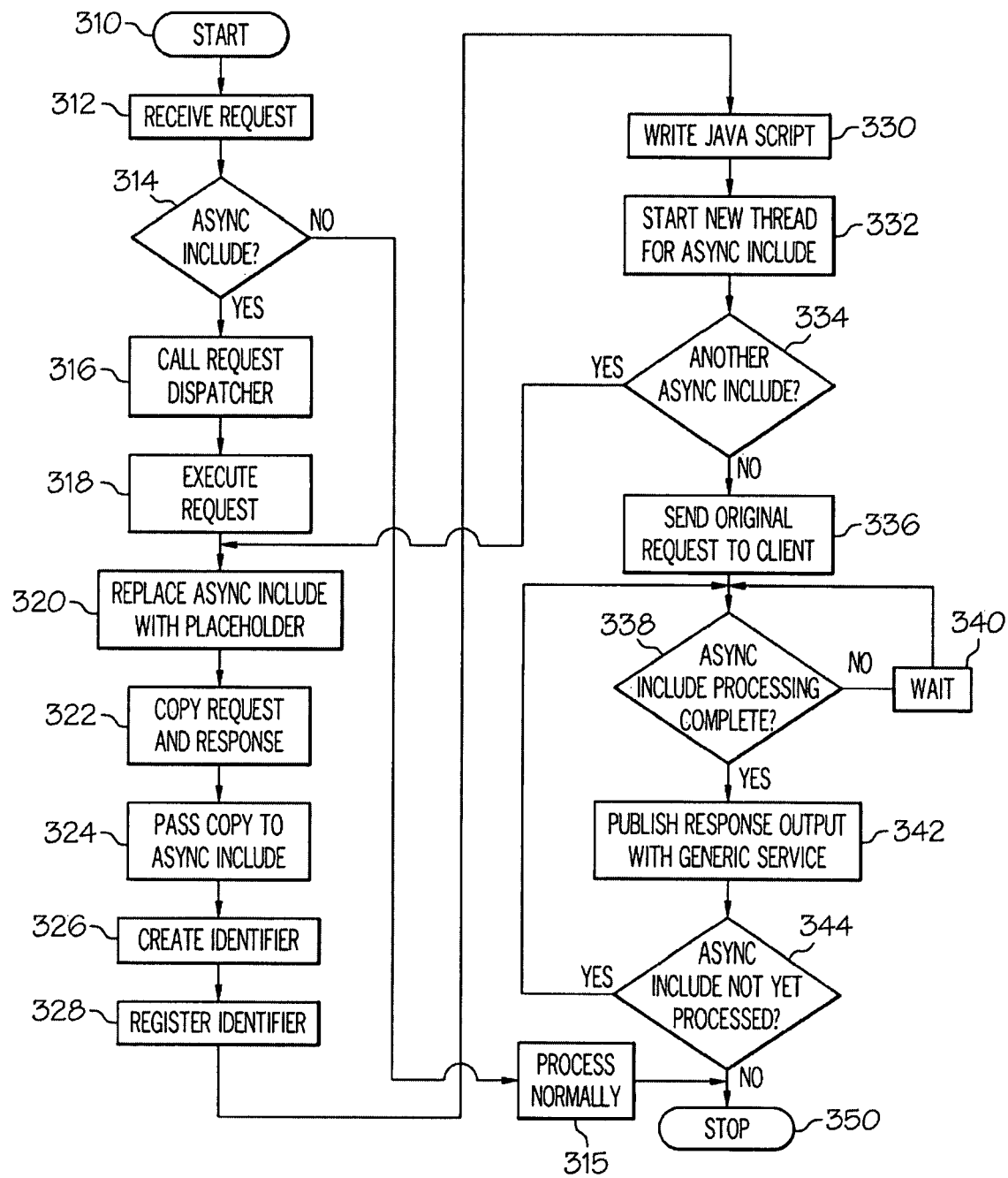
FIG. 3 depicts a flowchart of a Java Servlet Container.

FIG. 3 is a flowchart depicting the logic of Java Servlet Container 300. Although Java Servlet Container 300 is described here as a single application with four sub-components (see FIG. 2), Java Servlet Container 300 may be a collection of related servlets and applications that work together to perform the functions described herein. When the client sends an original request to the application server, the original request begins executing on an original thread. The original thread is a servlet/jsp received by Java Servlet Container 300 on the application server. Java Servlet Container 300 starts (310) when the original thread is received by application server tier 250 (312), and Java Servlet Container 300 determines whether the original request contains an async include (314). If not, Java Servlet Container 300 processes the request normally without utilizing any asynchronous behavior (315). If the request contains an async include, then request dispatcher 301 is called (316).

Request dispatcher 301 executes the request (318). When request dispatcher 301 executes the request, it executes the initial servlet/jsp resource as well as the async include that is part of the servlet/jsp. Request dispatcher 301 replaces the response output of the async include in the original request with a placeholder containing a unique identifier (320). The purpose of the placeholder is to indicate where the async include content will persist when the client receives the async include content from the generic service store (server store 601). When the client receives the async include content, the placeholders are replaced with the actual response output from the execution of the async include.

Request dispatcher 301 uses filter 302 to copy the original request and response object (322) and passes the copy to the async include (324). This is required because the request and response objects are not designed to be used on multiple threads concurrently. The request object is the representation of the request from the client to execute the resource. The response object is the representation of what is sent back to the client in the response to the request. Next, request dispatcher 301 creates a unique identifier for the async include (326) and registers the unique identifier with the server store (328). Register means a process in which the original thread registers a unique identifier (or token) with the server store prior to executing the async include to indicate that an async include is about to occur with the unique identifier (or token).

Request dispatcher 301 calls script writer 303 to write content and include javascript for the async include (330). The javascript contains AJAX style requests containing the unique identifier that corresponds to the async include so that the placeholder can be populated with the response at a later time. Request dispatcher 301 then uses Async Bean 304 to start a new thread for the async include (332). The new thread is sent to a specified asynchronous resource. Upon completion of writing the placeholders and javascript, any additional content from the original request is written, the original request completes, and the thread is returned. The javascript will be run transparently on the client for retrieving responses to the async include from the server store.

Java Servlet Container 300 then determines whether there is another async include in the original request (334). If there another async include in the original request, Java Servlet Container 300 goes to step 320. If not, Java Servlet Container 300 sends the original request to the client (336). Java Servlet Container 300 determines whether an async include has completed processing (338). If an async include has completed processing, Java Servlet Container 300 publishes the response output from the async include with the server store (342). If not, Java Servlet Container 300 waits (340) and returns to step 338. Java Servlet Container 300 determines whether there is an async include that has not yet completed processing (344). If so, Java Servlet Container 300 goes to step 338. If not, Java Servlet Container stops (350).

Figure 4:
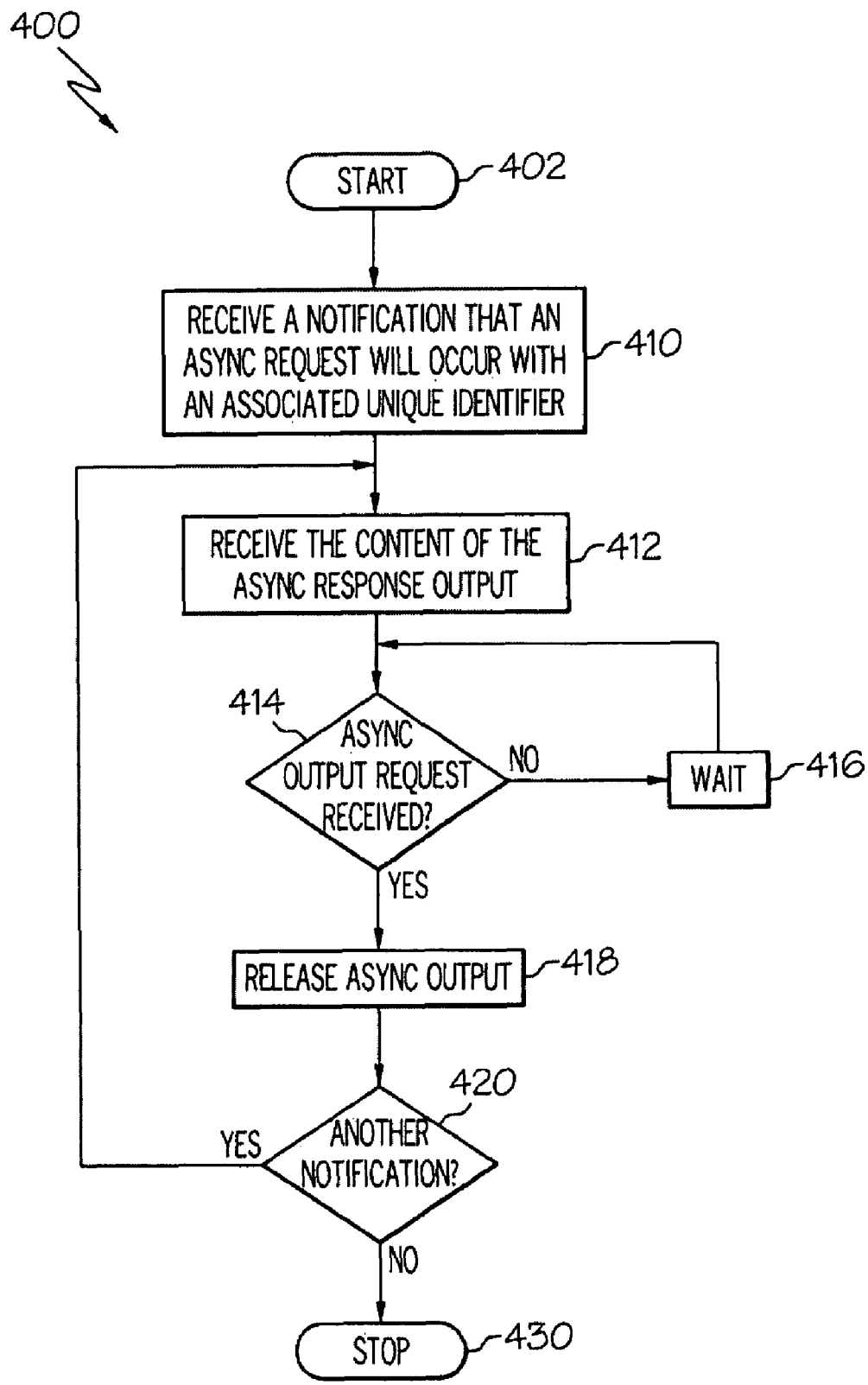
FIG. 4 depicts a flowchart of the Server Store Process.

FIG. 4 is a flowchart depicting the logic of Server Store Process 400. Server Store Process starts (402) and receives a notification that an asynchronous request will occur with an associated unique identifier (410). Server store 601 (see FIG. 2) receives the content of the asynchronous response output (412). Server Store Process 400 determines whether an async output request has been received from a client (414). If not, Server Store Process 400 waits (416) and returns to step 414. If an async output request has been received, then the Server Store Process 400 releases the async request output from server store 601 (418). Server Store Process 400 determines whether there is another notification (420). If so, Server Store Process returns to step 412, and if not, stops (430).

Figure 5:
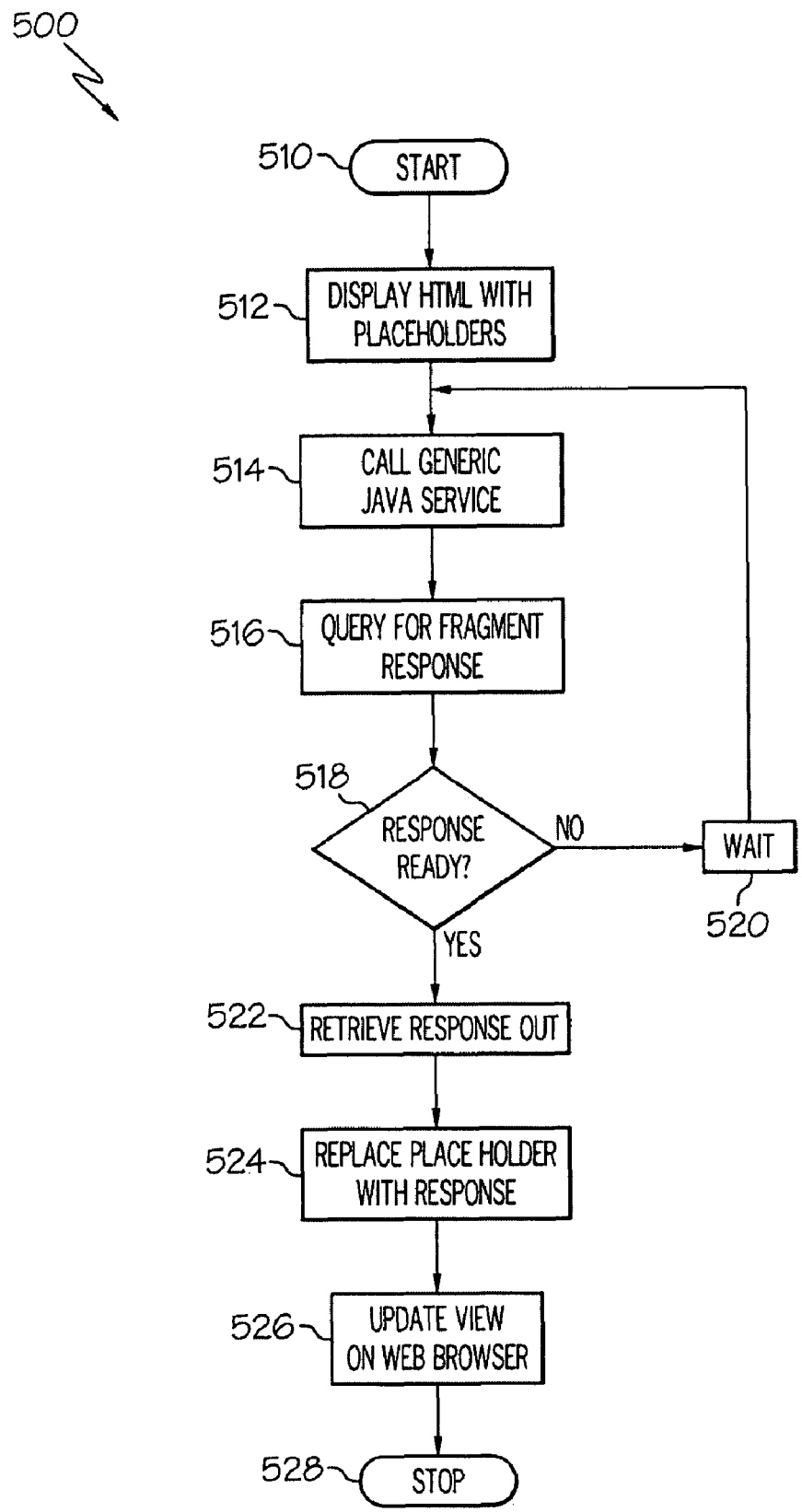
FIG. 5 depicts a flowchart of the Javascript Process.

FIG. 5 is a flowchart depicting the logic of flowchart of Javascript 500. Javascript 500 starts when received at client 210 (510) and displays on Browser 212 the placeholders for the request fragment responses (512). Javascript 500 calls Generic Java Service 600 (514) and queries for the request fragment response (516). If the request fragment response is not ready, Javascript 500 waits a predetermined period (520) and goes to step 514. If the request fragment response is ready, Javascript 500 retrieves the response (522), replaces the placeholder with the response (524), refreshes the HTML display on browser 212 (526) and stops (528).

Figure 6:
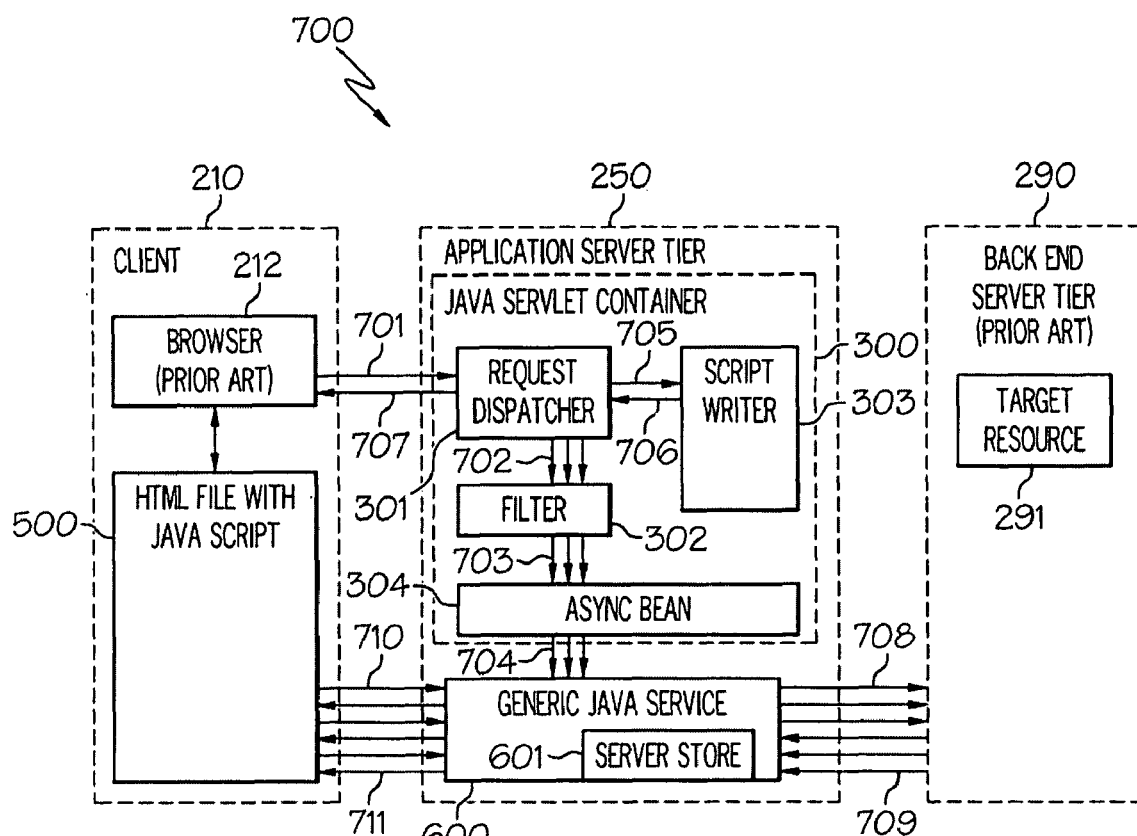
FIG. 6 depicts a diagram of an overview of the Asynchronous Aggregator process.

FIG. 6 depicts propagation of a request in distributed memory 700. Numeral 701 represents an original request made by browser 212 on client 210 to Java Servlet Container 300. Three async includes are identified in the original request, and Request Dispatcher 301 is called. The async includes are extracted and placeholders inserted into the original request. Numeral 707 represents the original request with placcholders for the async includes being returned to the client After the copies of the original request and response objects are passed to each of the async includes, numeral 702 represents the three async includes having unique identifiers created by filter 302. The unique identifiers are registered with the server store 601. Numeral 703 represents new threads being created by Async Bean 304. Numeral 704 represents registration of the three new threads with Generic Java Service 600. Numeral 705 and 706 represent request dispatcher 301 invoking script writer 303 to write content and include javascript for the new threads. Numerals 708 and 709 represent Generic Java Service 600 asynchronously accessing resources on backend server tier 290 while executing the async includes of the new threads. Responses to the three async includes are stored in server store 601. Numeral 710 represents client requests for the responses and numeral 711 represents the async include responses being sent to javascript 500 on client 210.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented process for asynchronously executing requests, the computer implemented process comprising:
   receiving an original request thread from a client at an application server;
   executing the original request;
   replacing an asynchronous component in the original request with a placeholder;
   starting a new thread for the asynchronous component having a unique identifier;
   registering the unique identifier at a server store;
   writing a script for retrieving the new thread output from the sever store;
   sending the new thread output to the server store;
   returning the original request thread with the script to the client; and
   when the new thread output is received at the server store, using the script to retrieve the new thread output from the server store and replacing the placeholder in the original request with the new thread output.

2. The computer implemented process of claim 1 further comprising:
   creating a first copy of a request object and a second copy of a response object from the original thread.

3. The computer implemented process of claim 1 wherein the asynchronous component is an async include.

4. An apparatus for asynchronously executing requests, the apparatus comprising:
   a processor;
   a memory connected to the processor;
   a service in the computer memory;
   a program in the memory operable to:
   receive an original request thread from a client at an application server;
   execute the original request;
   replace an asynchronous component of the original request with a placeholder;
   start a new thread for the asynchronous component having a unique identifier;
   register the unique identifier at a server store;
   write a script for retrieving a new thread output from the sever store;
   send the new thread output to the server store;
   return the original request thread with the script to the client;
   wherein when the new thread output is received at the server store, the script will retrieve the new thread output from the server store for the client and replace the placeholder in the original request thread with the new thread output.

5. The apparatus of claim 4 wherein the program further comprises:
   creating a first copy of a request object and a second copy of a response object from the original thread.

6. The apparatus of claim 4 wherein the asynchronous component is an async include.

7. A computer program product containing a plurality of instructions encoded on a computer usable storage memory to cause a computer to asynchronously execute requests, the plurality of instructions comprising:
   first instructions to receive an original request thread from a client at an application server;
   second instructions to execute the original request;
   third instructions to replace an asynchronous component of the original request with a placeholder;
   fourth instructions to start a new thread for the asynchronous component having a unique identifier;
   fifth instructions to register the unique identifier at a server store;
   sixth instructions to write a script for retrieving a new thread output from the sever store;
   seventh instructions to send the new thread output to the server store; and
   eighth instructions to return the original request thread with the script to the client;
   wherein when the new thread output is received at the server store, the script retrieves the new thread output from the server store and replace the placeholder in the original request thread with the new thread output.

8. The computer program product of claim 7 further comprising:
   ninth instructions to create a copy of a request object and tenth instructions to create a copy of a response object from the original thread.

9. The computer program product of claim 7 wherein the asynchronous component is an async include.

* * * * *